US009788336B2

(12) United States Patent
Sakaguchi et al.

(10) Patent No.: US 9,788,336 B2
(45) Date of Patent: Oct. 10, 2017

(54) COMMUNICATION SYSTEM, CONTROL STATION, RESOURCE CONTROL METHOD USING COMMUNICATION SYSTEM AND CONTROL STATION, AND MICROWAVE BASE STATION

(71) Applicant: Panasonic Corporation, Osaka (JP)

(72) Inventors: Kei Sakaguchi, Osaka (JP); Ehab Mahmoud Mohamed Mahmoud, Osaka (JP); Shinichi Miyamoto, Osaka (JP); Seiichi Sampei, Osaka (JP); Naganori Shirakata, Kanagawa (JP)

(73) Assignee: Panasonic Corporation, Osaka (JP)

( * ) Notice: Subject to any disclaimer, the term of this patent is extended or adjusted under 35 U.S.C. 154(b) by 280 days.

(21) Appl. No.: 14/821,673

(22) Filed: Aug. 7, 2015

(65) Prior Publication Data

US 2016/0056904 A1 Feb. 25, 2016

(30) Foreign Application Priority Data

Aug. 22, 2014 (JP) .................. 2014-169037

(51) Int. Cl.
*H04W 72/08* (2009.01)
*H04W 72/04* (2009.01)
(Continued)

(52) U.S. Cl.
CPC ........ *H04W 72/085* (2013.01); *H04B 17/309* (2015.01); *H04W 72/048* (2013.01); *H04W 64/006* (2013.01)

(58) Field of Classification Search
CPC .............. H04B 17/309; H04W 64/006; H04W 72/048; H04W 72/085; H04W 24/10;
(Continued)

(56) References Cited

U.S. PATENT DOCUMENTS 5,862,483 A * 1/1999 Fletcher ................ H04W 68/12
455/435.2
2005/0037775 A1* 2/2005 Moeglein .............. G01S 5/0036
455/456.1
(Continued)

FOREIGN PATENT DOCUMENTS

JP 2011-515035 5/2011
JP 2011-223135 11/2011
(Continued)

OTHER PUBLICATIONS

IEEE Computer Society "Part15.3: Wireless Medium Access Control (MAC) and Physical Layer (PHY) Specifications for High Rate Wireless Personal Area Networks (WPANs)" IEEE 802. 15.3c-2009 Standard for Information Technology, Oct. 2009.

*Primary Examiner* — Mounir Moutaouakil
(74) *Attorney, Agent, or Firm* — Seed Intellectual Property Law Group LLP

(57) ABSTRACT

A microwave base station estimates a first position of a terminal station that has transmitted millimeter-wave signal quality information and a second position of a terminal station that has transmitted a data bandwidth reservation request and transmits the millimeter-wave signal quality information and the first position or the data bandwidth reservation request and the second position to a control station, and the control station stores the millimeter-wave signal quality information and the first position in a database in association with each other and determines, for the terminal station that has transmitted the data bandwidth reservation request, a millimeter-wave base station with which communication is to be performed, a first directivity, and a second directivity by referring to the database by using
(Continued)

the second position, and allocates a radio resource based on the determined millimeter-wave base station, first directivity, and second directivity.

10 Claims, 8 Drawing Sheets

(51) Int. Cl.
  *H04B 17/309* (2015.01)
  *H04W 64/00* (2009.01)
(58) Field of Classification Search
  CPC ......... H04W 28/0252; H04W 28/0278; H04W 72/1284; H04W 88/06
  See application file for complete search history.

(56) References Cited

U.S. PATENT DOCUMENTS

| | | | |
|---|---|---|---|
| 2005/0148368 A1* | 7/2005 | Scheinert | H04W 24/02 455/561 |
| 2008/0207170 A1* | 8/2008 | Khetawat | H04W 60/005 455/411 |
| 2011/0243106 A1* | 10/2011 | Hsu | H04L 5/0096 370/336 |
| 2011/0244908 A1 | 10/2011 | Morioka | |
| 2012/0267015 A1 | 10/2012 | Kim et al. | |
| 2013/0100839 A1* | 4/2013 | Arora | H04W 36/0016 370/252 |
| 2015/0195867 A1* | 7/2015 | Koc | H04W 76/048 370/311 |
| 2015/0351119 A1* | 12/2015 | Song | H04W 72/1268 370/329 |
| 2016/0143039 A1* | 5/2016 | Baldemair | H04W 72/1252 370/329 |
| 2016/0295442 A1* | 10/2016 | Virtej | H04W 72/1284 |
| 2016/0374067 A1* | 12/2016 | Uchiyama | H04W 72/04 |
| 2016/0374077 A1* | 12/2016 | Fukuta | H04W 72/0426 |
| 2017/0034866 A1* | 2/2017 | Wager | H04W 76/025 |
| 2017/0111818 A1* | 4/2017 | Sebire | H04W 28/0278 |

FOREIGN PATENT DOCUMENTS

| | | |
|---|---|---|
| JP | 2012-509022 | 4/2012 |
| JP | 2013-515170 | 5/2013 |
| WO | 2009/151671 | 12/2009 |
| WO | 2010/056887 | 5/2010 |

\* cited by examiner

FIG. 6

| POSITIONAL INFORMATION (FINGERPRINT) | TERMINAL NUMBER | AP 1 | | AP 2 | |
|---|---|---|---|---|---|
| | | BEAM SET 1 | BEAM SET 2 | BEAM SET 1 | BEAM SET 2 |
| [101100] | 1 | -63 dBm | -79 dBm | -80 dBm | -85 dBm |
| [110010] | 2 | -90 dBm | -50 dBm | -90 dBm | -75 dBm |
| [001101] | 3 | -86 dBm | -90 dBm | -88 dBm | -65 dBm |
| [010000] | 4 | -99 dBm | -60 dBm | -50 dBm | -99 dBm |

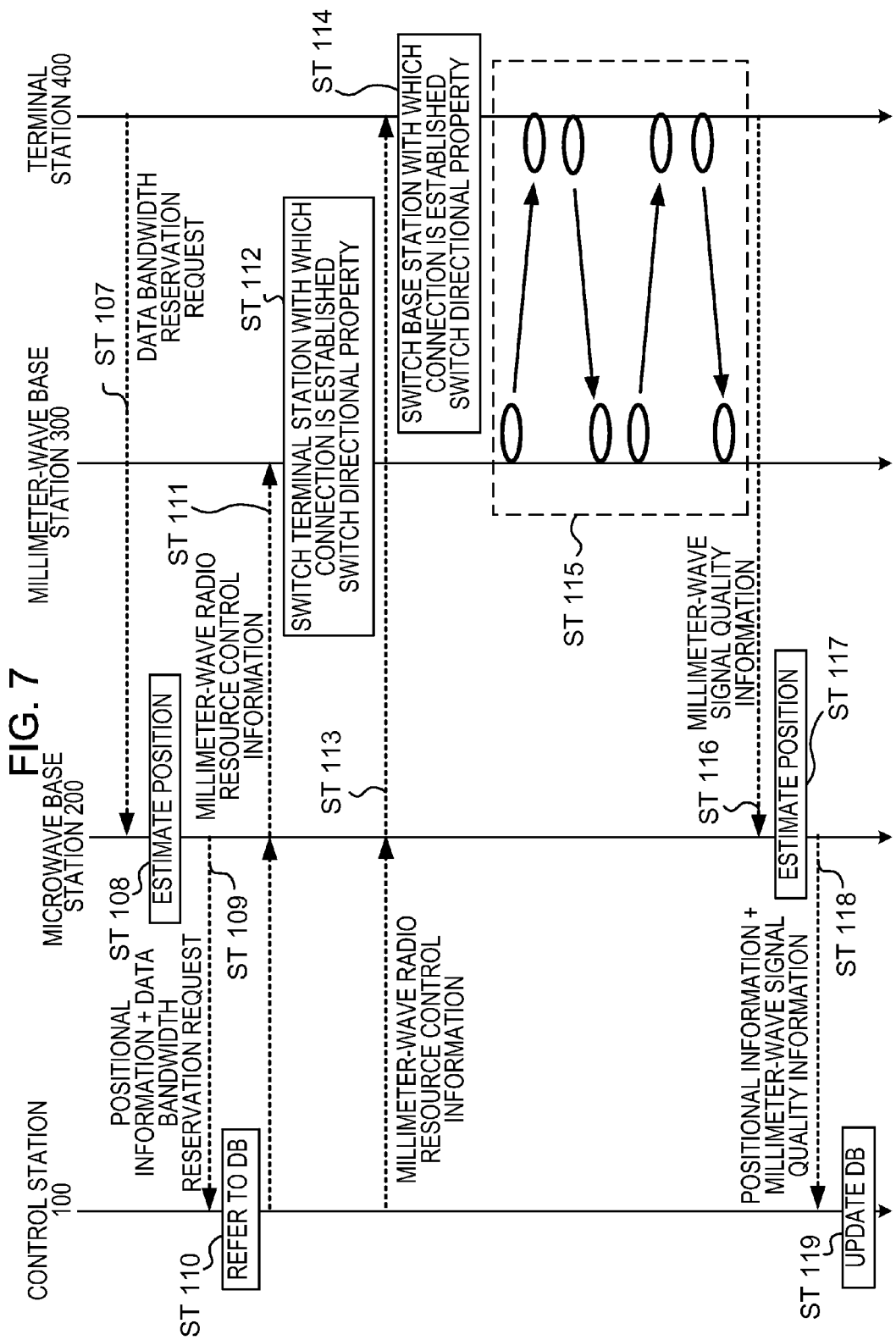

COMMUNICATION SYSTEM, CONTROL STATION, RESOURCE CONTROL METHOD USING COMMUNICATION SYSTEM AND CONTROL STATION, AND MICROWAVE BASE STATION

BACKGROUND

1. Technical Field

The present disclosure relates to communication systems, control stations, resource control methods, and microwave base stations.

2. Description of the Related Art

In recent years, in response to a rapid increase in traffic demand, in order to ensure a bandwidth of 1 GHz or more, a small base station that performs communication by using a millimeter-wave band has been introduced. For example, a communication system (which is sometimes referred to as a heterogeneous network) in which a plurality of small base stations are provided in a communication area of a base station that performs communication by using a microwave band is envisioned.

With such a small base station, it is impossible to increase the radio wave travel distance due to the use of the millimeter-wave band, which significantly increases propagation loss.

As one mode that contributes to avoidance of such propagation loss or the enhancement of the communication speed and the expansion of a cell area, there is a scheme in which directivity control (beam forming) is performed in a base station by using a plurality of antenna elements (an antenna array). In the scheme in which directivity control is performed, by directing the radio waves transmitted from the base station in a direction in which a terminal station is present, it is possible to make the radio waves reach a more distant point as compared to a case in which transmission is performed non-directionally and expand a cell area covered thereby. Moreover, since it is possible to improve the signal to interference-plus-noise power ratio (SINR), the terminal station can use a modulation scheme and a code rate with high frequency usage efficiency and therefore perform communication at a high transmission speed (for example, see IEEE 802.15.3c-2009 Standard for Information Technology-Telecommunications and Information Exchange between systems-Local and Metropolitan networks-Specific requirements-Part 15.3: Wireless Medium Access Control (MAC) and Physical Layer (PHY) Specifications for High Rate Wireless Personal Area Networks (WPANs): Millimeter-wave based Alternative Physical Layer Extension Amendment is ratified by Standards Board of IEEE).

However, in a stage prior to the establishment of initial connection, since the base station does not have information based on which the direction in which the terminal station is present is determined, the base station cannot transmit a signal by adjusting the directivity so that a signal travels only in the direction in which the terminal station is present.

Thus, a method has been proposed by which a base station divides an area which the base station desires to use as a cell area into sub-areas in accordance with the width of a directivity and transmits a signal while successively switching the directivity such that the directivity is adjusted so that a signal travels toward each of the sub-areas. This method makes it possible to expand a covered area by directivity control while covering the whole of an area which the base station desires to use as a cell area by successive operations.

SUMMARY

However, when initial connection is performed with switching of a directivity being performed, it takes a longer time for initial connection to be established than when initial connection is performed non-directionally.

Thus, a non-limiting exemplary embodiment of the present disclosure provides a communication system, a control station, and a resource control method which can shorten the time that elapses before initial connection is established when initial connection is performed with switching of a directivity being performed.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a communication system including: a microwave base station that performs communication by using a microwave band; a plurality of millimeter-wave base stations that are provided in a communication area of the microwave base station and perform communication by using a millimeter-wave band while switching a directivity; a plurality of terminal stations, each performing communication with the microwave base station and a millimeter-wave base station which is any one of the plurality of millimeter-wave base stations; and a control station that is connected to the microwave base station, in which a terminal station which is each of the plurality of terminal stations includes a signal quality estimator that estimates the signal quality of each of a plurality of combinations of a first directivity of the millimeter-wave base station and a second directivity of the terminal station and generates millimeter-wave signal quality information indicating the signal quality, and a radio communicator that transmits the millimeter-wave signal quality information or a data bandwidth reservation request for starting data communication to the microwave base station, the microwave base station includes a position estimator that estimates a first position of the terminal station that has transmitted the millimeter-wave signal quality information and a second position of the terminal station that has transmitted the data bandwidth reservation request, and a communicator that transmits, to the control station, the millimeter-wave signal quality information and the first position or the data bandwidth reservation request and the second position, and the control station includes a database that stores the millimeter-wave signal quality information and the first position in association with each other, and a controller that determines, for the terminal station that has transmitted the data bandwidth reservation request, a millimeter-wave base station with which communication is to be performed, the first directivity, and the second directivity by referring to the database by using the second position, and allocates a radio resource based on the determined millimeter-wave base station, first directivity, and second directivity.

These general and specific aspects may be implemented using a device, a system, a method, and a computer program, and any combination of devices, systems, methods, and computer programs.

According to the present disclosure, it is possible to shorten the time that elapses before initial connection is established when initial connection is performed with switching of a directivity being performed.

BRIEF DESCRIPTION OF THE DRAWINGS

FIG. 6 depicts an example of a database according to this embodiment;

FIG. 7 depicts a sequence of the operation of each device in a data communication period according to this embodiment;

DETAILED DESCRIPTION

Hereinafter, with reference to the drawings, an embodiment of the present disclosure will be described in detail.

Embodiment

Configuration of a Communication System

First, the configuration of a communication system 10 according to this embodiment will be described with reference to FIG. 1.

The communication system 10 according to this embodiment includes a control station 100, a plurality of microwave base stations (microwave access points (APs)) 200, a plurality of millimeter-wave base stations (millimeter-wave APs) 300, and a plurality of terminal stations (STAs, which are sometimes referred to as user equipment (UE)) 400.

Figure 1:
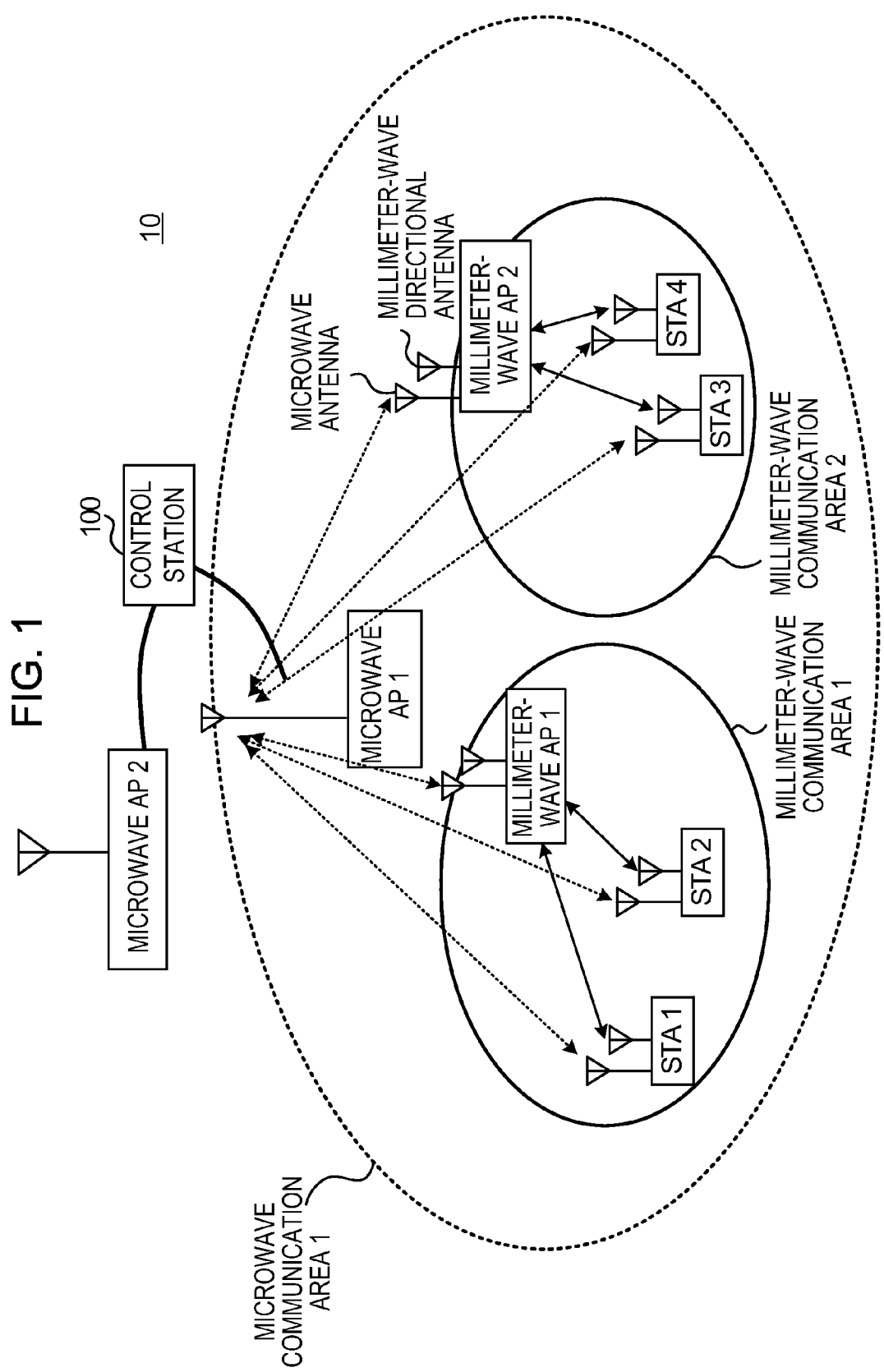
FIG. 1 depicts a communication system according to an embodiment.

FIG. 1 depicts, as an example, the control station 100, two microwave APs 1 and 2, and devices present in a microwave communication area 1 covered by the microwave AP 1. Specifically, in the microwave communication area 1 with relative wide coverage, a millimeter-wave AP 1 and a millimeter-wave AP 2 respectively form a millimeter-wave communication area 1 and a millimeter-wave communication area 2, each having relatively narrow coverage. Moreover, an STA 1 and an STA 2 are present in the millimeter-wave communication area 1, and an STA 3 and an STA 4 are present in the millimeter-wave communication area 2.

The control station 100 is connected to the plurality of microwave base stations 200 (the microwave APs 1 and 2 in FIG. 1). Connection between the control station 100 and the microwave base stations 200 may be wireless or wire connection; examples of connection therebetween include connection established by Ethernet®, WiFi®, universal serial bus (USB), and optical communications. The control station 100 holds positional information of each terminal station 400 which is reported from each microwave base station 200, millimeter-wave signal quality information in communication using a millimeter-wave band, and so forth. The control station 100 controls a radio resource for millimeter-wave communication for the terminal station 400 based on the information held by the control station 100. The control station 100 is sometimes referred to as a cooperation coordinator.

Each of the microwave base stations 200 (the microwave APs 1 and 2 in FIG. 1) performs communication with each millimeter-wave base station 300 or terminal station 400 by using a microwave band such as a 2.4-GHz band or a 5-GHz band. Examples of microwave communication include communication by WiFi, 3GPP Long Term Evolution (LTE), and Zigbee®. Moreover, the microwave base station 200 reports, to the control station 100, the millimeter-wave signal quality information which is received from the terminal station 400 performing communication with the millimeter-wave base station 300 in the communication area covered by the microwave base station 200 by using a millimeter-wave band. In so doing, the microwave base station 200 estimates the position of the terminal station 400 by using a signal which is transmitted from the terminal station 400 in the microwave band and reports the positional information to the control station 100.

The millimeter-wave base stations 300 (the millimeter-wave APs 1 and 2 in FIG. 1) are provided in the communication area of the microwave base station 200 and perform communication while switching a directivity (a sector) by using a millimeter-wave band such as a 60-GHz band, for example. Each millimeter-wave base station 300 includes a microwave antenna and a millimeter-wave directional antenna and performs communication with the microwave base station 200 by using the microwave band and performs communication with the terminal station 400 by using the millimeter-wave band. Examples of millimeter-wave communication include communication by WiGig®, for example. The millimeter-wave base station 300 switches the directivity based on an instruction from the microwave base station 200.

Each of the terminal stations 400 (the STAs 1 to 4 in FIG. 1) includes a microwave antenna and a millimeter-wave directional antenna and performs communication with the microwave base station 200 by using the microwave band and performs communication with the millimeter-wave base station 300 by using the millimeter-wave band. The terminal station 400 switches the directivity based on an instruction from the microwave base station 200 at the time of millimeter-wave communication.

Figure 2:
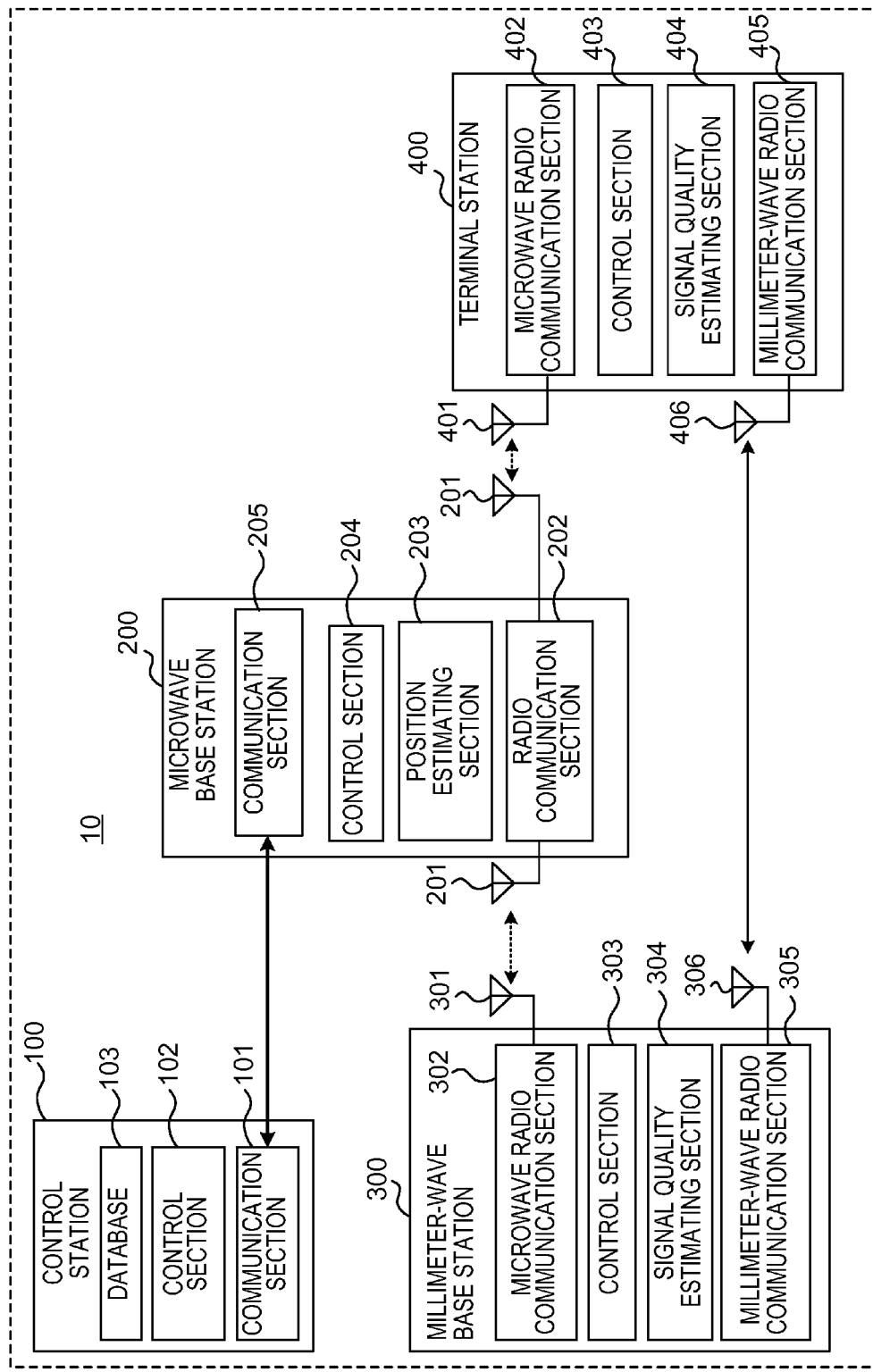
FIG. 2 depicts the configuration of each device of the communication system according to this embodiment.

FIG. 2 is a block diagram depicting the configurations of the control station 100, the microwave base station 200, the millimeter-wave base station 300, and the terminal station 400 in the communication system 10 depicted in FIG. 1.

<Configuration of the Control Station 100>

The control station 100 includes a communication section 101, a control section 102, and a database 103.

The communication section 101 receives control information from each microwave base station 200 and transmits the control information to each microwave base station 200. Here, a communication phase of the millimeter-wave communication which is performed in the communication system 10 includes a channel measurement period in which channel measurement is performed and a data communication period in which data communication is performed.

The control information which is received by the communication section 101 in the channel measurement period contains, for example, the millimeter-wave signal quality information indicating the signal quality in each combination (which is sometimes referred to as a beam set) of the directivity of the millimeter-wave base station 300 and the directivity of the terminal station 400 and the positional information indicating the position of the terminal station 400 corresponding to the millimeter-wave signal quality information. Examples of the millimeter-wave signal quality information include a reception level (received power), a signal to noise ratio (SNR), and a signal to interference and noise ratio (SINR) of the signal transmitted from the millimeter-wave base station 300, the reception level (the received power), the SNR, and the SINR in the terminal station 400.

The control information which is received by the communication section 101 in the data communication period contains, for example, a data bandwidth reservation request for millimeter-wave communication and the positional information indicating the position of the terminal station 400 which has made the data bandwidth reservation request. Moreover, the control information which is transmitted from the communication section 101 in the data communication period contains, for example, millimeter-wave radio resource control information indicating a millimeter-wave radio resource containing a millimeter-wave base station 300 with which communication is to be performed, the millimeter-wave base station 300 to which the terminal station 400 connects at the time of millimeter-wave communication, a terminal station 400 with which communication is to be performed, the terminal station 400 to which the millimeter-wave base station 300 connects at the time of millimeter-wave communication, a directivity which is used at the time of millimeter-wave communication, or the like.

In the channel measurement period, the control section 102 notifies the millimeter-wave base station 300 of the channel measurement request and makes a database of the millimeter-wave signal quality information generated by the terminal station 400 and the positional information of the terminal station 400 generated by the microwave base station 200 in a state in which the millimeter-wave signal quality information and the positional information are related to each other. That is, in the database 103, the positional information of the terminal station 400 and the millimeter-wave signal quality information are stored in a state in which the positional information of the terminal station 400 and the millimeter-wave signal quality information are related to each other. It should be noted that the millimeter-wave signal quality information indicates the signal quality of each of a plurality of combinations (beam sets) of the directivity of the millimeter-wave base station 300 and the directivity of the terminal station 400.

Every time the control section 102 receives the control information from the microwave base station 200, the control section 102 updates the database 103.

In the data communication period, by referring to the database 103 by using the positional information of the terminal station 400 which has made the data bandwidth reservation request as a key, the control section 102 determines, for the terminal station 400, a millimeter-wave radio resource containing a millimeter-wave base station 300 with which communication is to be performed, the directivity of the millimeter-wave base station 300 and the directivity of the terminal station 400, a time slot, transmitted power, or a frequency channel.

<Configuration of the Microwave Base Station 200>

The microwave base station 200 includes an antenna 201 for microwave communication, a radio communication section 202, a position estimating section 203, a control section 204, and a communication section 205.

The radio communication section 202 performs microwave communication with the millimeter-wave base station 300 or the terminal station 400 via the antenna 201 in accordance with an instruction from the control section 204. For example, in the channel measurement period, the radio communication section 202 transmits the channel measurement request to the millimeter-wave base station 300 and receives the millimeter-wave signal quality information from the terminal station 400. Moreover, in the data communication period, the radio communication section 202 receives the data bandwidth reservation request from the terminal station 400 and transmits the millimeter-wave radio resource control information to the millimeter-wave base station 300 and the terminal station 400.

The position estimating section 203 estimates the position of the terminal station 400 that has transmitted the millimeter-wave signal quality information and the position of the terminal station 400 that has transmitted the data bandwidth reservation request. For example, the position estimating section 203 estimates the position of the terminal station 400 by using the signal transmitted from the terminal station 400 in the microwave band. More specifically, the position estimating section 203 estimates propagation characteristic information between the microwave base station 200 and the terminal station 400 by using a preamble of a data packet containing the millimeter-wave signal quality information or the data bandwidth reservation request which is transmitted from the terminal station 400 by using the microwave band, and uses the estimated propagation characteristic information as the positional information. Propagation path information is, for example, any one of a reception level of the preamble, a channel estimation symbol reception waveform, a reception correlation value, an impulse response (a delay profile), frequency characteristics (a frequency spectrum), and so forth in the microwave base station 200. The details of the method of estimating the position of the terminal station 400 which is performed in the position estimating section 203 will be described later.

In the channel measurement period, the control section 204 transmits the channel measurement request received from the control station 100 to the millimeter-wave base station 300 by using the radio communication section 202 and transmits the millimeter-wave signal quality information received from the terminal station 400 and the positional information indicating the position of the terminal station 400 estimated in the position estimating section 203 to the control station 100 by using the communication section 205. Moreover, in the data communication period, the control section 204 transmits the data bandwidth reservation request received from the terminal station 400 and the positional information indicating the position of the terminal station 400 estimated in the position estimating section 203 to the control station 100 by using the communication section 205. Furthermore, the control section 204 outputs the millimeter-wave radio resource control information received from the control station 100 to the millimeter-wave base station 300 and the terminal station 400 by using the radio communication section 202.

The communication section 205 performs transmission and reception of the control information between the microwave base station 200 and the control station 100 in accordance with an instruction from the control section 204.

<Configuration of the Millimeter-Wave Base Station 300>

The millimeter-wave base station 300 includes an antenna 301 for microwaves, a microwave radio communication section 302, a control section 303, a signal quality estimating section 304, a millimeter-wave radio communication section 305, and an antenna 306 for millimeter waves.

The microwave radio communication section 302 performs microwave communication with the microwave base station 200 via the antenna 301 in accordance with an instruction from the control section 303.

In the channel measurement period, the control section 303 measures the signal quality while switching the directivity between the millimeter-wave base station 300 and the terminal station 400. For example, the control section 303 transmits a packet for channel quality measurement to the terminal station 400 while changing the directivity by using the millimeter-wave radio communication section 305. Moreover, the control section 303 outputs, to the signal quality estimating section 304, the packet for channel quality measurement received from the terminal station 400. Furthermore, in the data communication period, the control section 303 gives an instruction on the directivity to the millimeter-wave radio communication section 305 in accordance with the millimeter-wave radio resource control information received from the microwave base station 200. Then, the control section 303 controls data communication between the millimeter-wave base station 300 and the terminal station 400.

The signal quality estimating section 304 estimates the signal quality by using the packet for channel quality measurement which the terminal station 400 has transmitted while changing the directivity.

The millimeter-wave radio communication section 305 performs millimeter-wave communication with the terminal station 400 via the antenna 306. In so doing, the millimeter-wave radio communication section 305 sets the directivity in accordance with an instruction from the control section 303.

<Configuration of the Terminal Station 400>

The terminal station 400 includes an antenna 401 for microwaves, a microwave radio communication section 402, a control section 403, a signal quality estimating section 404, a millimeter-wave radio communication section 405, and an antenna 406 for millimeter waves.

The microwave radio communication section 402 performs microwave communication with the microwave base station 200 via the antenna 401 in accordance with an instruction from the control section 403.

In the channel measurement period, the control section 403 measures the signal quality while switching the directivity between the terminal station 400 and the millimeter-wave base station 300. For example, the control section 403 outputs the packet for channel quality measurement received from the millimeter-wave base station 300 to the signal quality estimating section 404. Moreover, the control section 403 transmits the packet for channel quality measurement to the millimeter-wave base station 300 while changing the directivity by using the millimeter-wave radio communication section 405. Then, the control section 403 transmits the millimeter-wave signal quality information generated in the signal quality estimating section 404 to the microwave base station 200 by using the microwave radio communication section 402.

In the data communication period, the control section 403 first transmits a data bandwidth reservation request for starting data communication to the microwave base station 200 by using the microwave radio communication section 402. Moreover, in the data communication period, the control section 403 gives an instruction on the directivity to the millimeter-wave radio communication section 405 in accordance with the millimeter-wave radio resource control information received from the microwave base station 200. Then, the control section 403 controls data communication between the millimeter-wave base station 300 and the terminal station 400.

The signal quality estimating section 404 estimates the signal quality by using the packet for channel quality measurement which the millimeter-wave base station 300 has transmitted while changing the directivity. Then, the signal quality estimating section 404 generates the millimeter-wave signal quality information indicating the signal quality of each of the plurality of combinations (beam sets) of the directivity of the millimeter-wave base station 300 and the directivity of the terminal station 400.

The millimeter-wave radio communication section 405 performs millimeter-wave communication with the millimeter-wave base station 300 via the antenna 406. In so doing, the millimeter-wave radio communication section 405 sets the directivity in accordance with an instruction from the control section 403.

<Operation of the Communication System 10>

Next, the operation of the communication system 10 according to this embodiment will be described.

Figure 3:
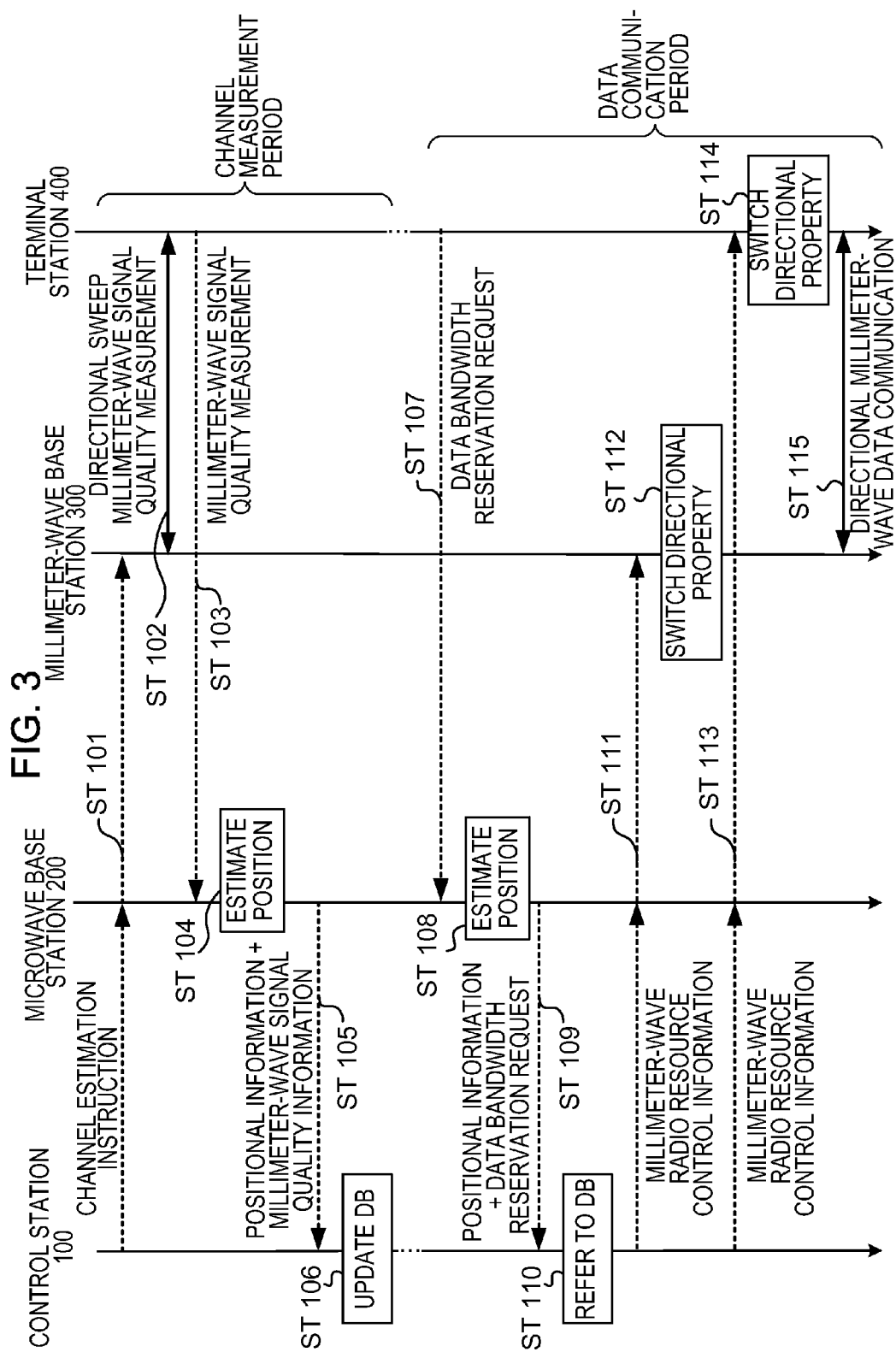
FIG. 3 depicts a sequence of the operations of devices of the communication system according to this embodiment.

FIG. 3 is a sequence diagram depicting the operations of the devices forming the communication system 10 according to this embodiment. In FIG. 3, a dotted arrow indicates microwave communication and a solid arrow indicates millimeter-wave communication. As described earlier, it should be noted that communication between the control station 100 and the microwave base station 200 is not limited to microwave communication and may be wire communication. Moreover, communication between the control station 100 and the millimeter-wave base station 300 may be directly performed without the microwave base station 200.

Furthermore, processing in step (hereinafter written as "ST") 101 to ST 106 depicted in FIG. 3 corresponds to processing in the channel measurement period and processing in ST 107 to ST 115 corresponds to processing in the data communication period.

In ST 101, the control station 100 notifies, via the microwave base station 200, the millimeter-wave base station 300 of a channel estimation instruction giving an instruction to perform signal quality measurement between the millimeter-wave base station 300 and the terminal station 400.

In ST 102, the millimeter-wave base station 300 that has received the channel estimation instruction in ST 101 performs directional sweep processing (millimeter-wave signal quality measurement) between the millimeter-wave base station 300 and the terminal station 400.

Figure 4:
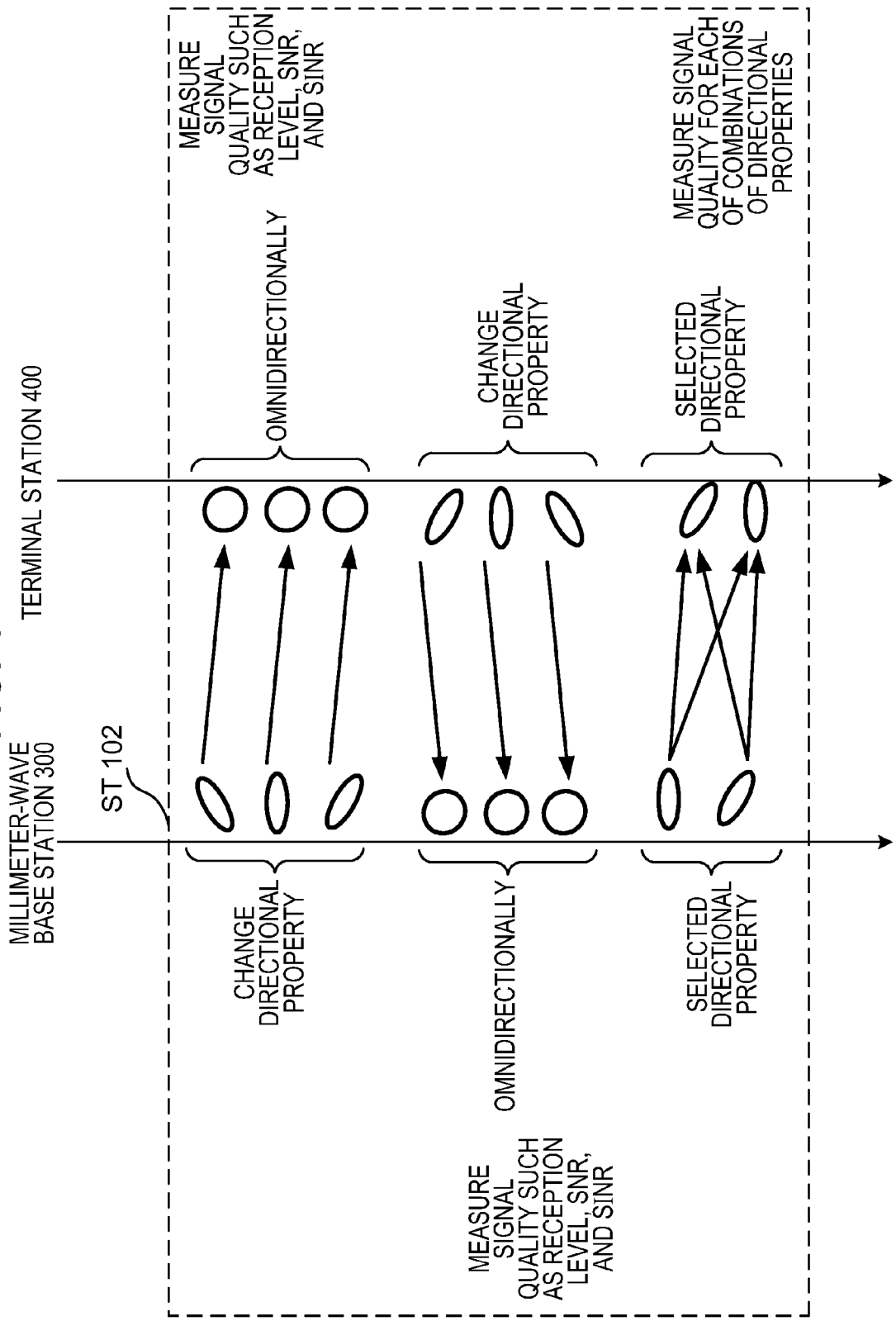
FIG. 4 depicts a sequence of the operation of each device in a channel measurement period according to this embodiment.

For example, as depicted in FIG. 4, in directional sweep processing in ST 102, the millimeter-wave base station 300 first transmits the packet for channel quality measurement while changing the directivity, and the terminal station 400 estimates the signal quality by using the omnidirectionally- (non-directionally-) received packet for channel quality measurement. Then, the terminal station 400 transmits the packet for channel quality measurement while changing the directivity, and the millimeter-wave base station 300 estimates the signal quality by using the omnidirectionally-received packet for channel quality measurement. Moreover, the millimeter-wave base station 300 and the terminal station 400 each select a predetermined number of directivity from among a plurality of directivity switched therein, the predetermined number of directivity with which better signal quality could be obtained.

Then, for each combination (beam set) of the selected directivity of the millimeter-wave base station 300 and the selected directivity of the terminal station 400, the millimeter-wave base station 300 transmits the packet for channel quality measurement and the terminal station 400 performs signal quality measurement similar to that described above by using the packet for channel quality measurement. Then, the terminal station 400 generates the millimeter-wave signal quality information indicating the signal quality in each beam set. For each beam set, the terminal station 400 may transmit the packet for channel quality measurement and the millimeter-wave base station 300 may generate the millimeter-wave signal quality information by using the packet for channel quality measurement. Moreover, the directional sweep processing depicted in FIG. 4 is an example and is not limited to the processing depicted in FIG. 4.

Back in FIG. 3, in ST 103, the terminal station 400 reports the millimeter-wave signal quality information generated in ST 102 to the microwave base station 200.

In ST 104, the microwave base station 200 estimates the position of the terminal station 400 which has transmitted the millimeter-wave signal quality information in ST 103. For example, the microwave base station 200 estimates the position of the terminal station 400 by using the packet containing the millimeter-wave signal quality information transmitted from the terminal station 400.

Figure 5:
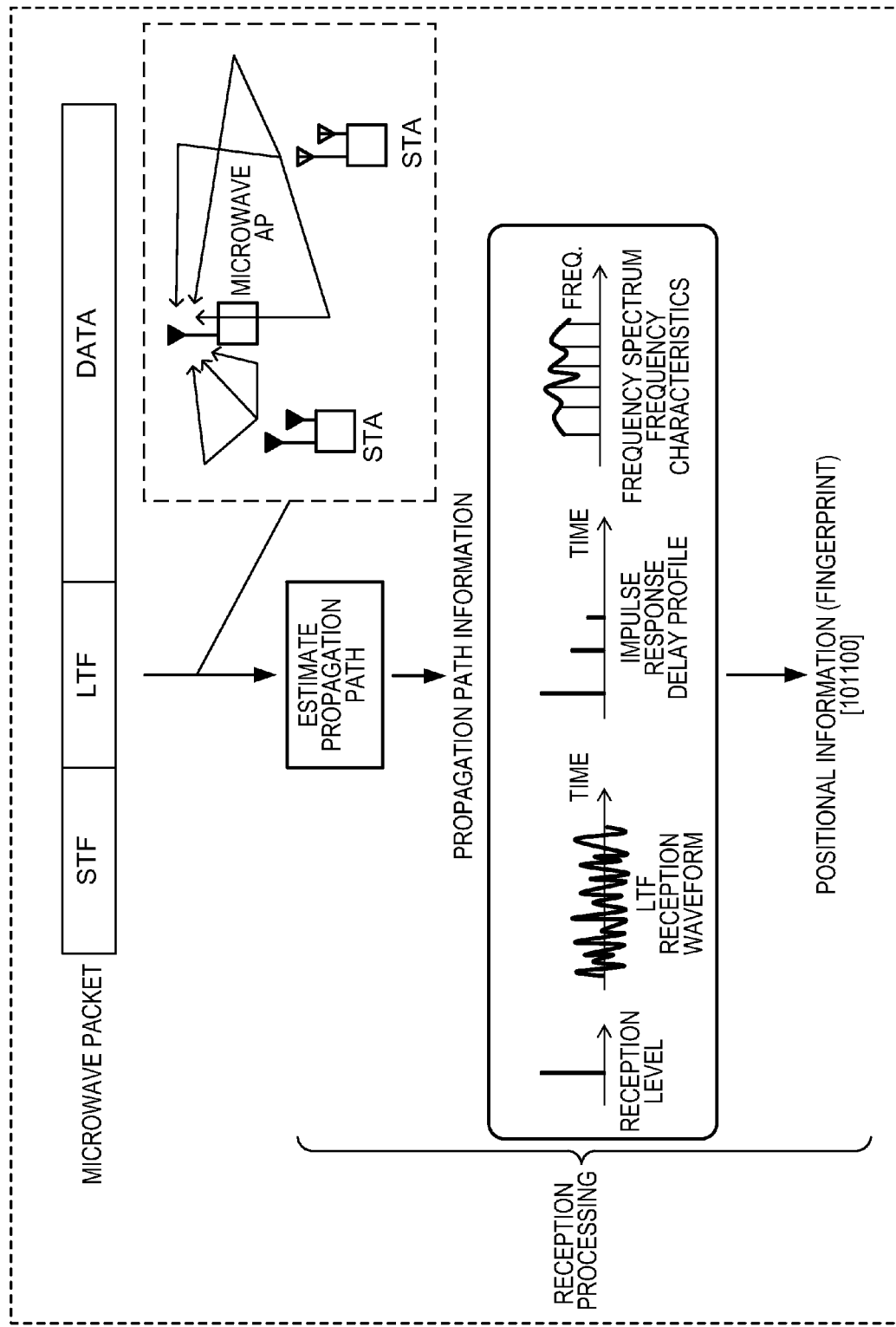
FIG. 5 depicts an example of a terminal position estimation method according to this embodiment.

FIG. 5 depicts an example of a method by which the microwave base station 200 estimates the position of the terminal station 400 by using the packet transmitted from the terminal station 400.

For example, the packet containing the millimeter-wave signal quality information transmitted from the terminal station 400 in ST 103 of FIG. 3 adopts the configuration depicted in FIG. 5. Specifically, the packet transmitted from the terminal station 400 is formed of a short training field (STF) containing a synchronization detection preamble, a long training field (LTF) containing a propagation estimation preamble, and a DATA section containing the millimeter-wave signal quality information.

In the reception processing depicted in FIG. 5, the microwave base station 200 (the position estimating section 203) performs propagation path estimation by using the LTF and generates, for the LTF, propagation path information indicating a reception level, a received signal waveform, an impulse response (a delay profile), a frequency spectrum (frequency characteristics), or the like.

Here, the packet adopting the configuration of FIG. 5 is transmitted from the terminal station 400 (STA) to the microwave base station 200 (microwave AP) by using the microwave band. In this case, as depicted in FIG. 5, as a result of a signal from the terminal station 400 being reflected or refracted by a building, a landform, or the like situated at some midpoint in a propagation path, the propagation environment of the signal becomes a multipath environment in which the signal reaches the microwave base station 200 via a plurality of channels (paths). It has been known that, in the propagation path of microwave communication, a multipath rich environment in which a large number of paths are present is provided.

Therefore, in microwave communication, the radio signal travel path varies greatly depending on the positional relationship between transmitting and receiving devices (the positional relationship between the terminal station 400 and the microwave base station 200). That is, the propagation path information which is generated in the microwave base station 200 differs depending on the position of the terminal station 400 in the microwave communication area.

Thus, in this embodiment, the microwave base station 200 (the position estimating section 203) uniquely relates the propagation path information between the microwave base station 200 and the terminal station 400 to the positional information of the terminal station 400. That is, the microwave base station 200 uses the propagation path information between the microwave base station 200 and the terminal station 400 as the positional information of the terminal station 400. For example, as depicted in FIG. 5, the microwave base station 200 may represent the positional information (which is sometimes referred to as a fingerprint) of the terminal station 400 as a string of a predetermined number of bits.

Back in FIG. 3, in ST 105, the microwave base station 200 reports the millimeter-wave signal quality information acquired in ST 103 and the positional information generated in ST 104 to the control station 100.

In ST 106, the control station 100 stores the millimeter-wave signal quality information received in ST 105 and the positional information corresponding to the millimeter-wave signal quality information in the database 103 in a state in which the millimeter-wave signal quality information and the positional information are related to each other. That is, in the database 103, by using, as a label, the positional information obtained by using the signal in the microwave band, the information on the signal quality in the millimeter-wave band is stored.

FIG. 6 depicts an example of the information stored in the database 103. In FIG. 6, to each of a plurality of pieces of positional information of the terminal stations 400, signal quality information (a reception level [dBm] in FIG. 6) in each of combinations (a beam set 1 and a beam set 2 in FIG. 6) of each of the directivities of each of the millimeter-wave base stations 300 (the millimeter-wave AP 1 and the millimeter-wave AP 2 in FIG. 6) and each of the directivities of each terminal station 400 is related. That is, the database 103 stores information indicating the level of the reception quality in each directivity, the reception quality between the terminal station 400 in the position indicated by the positional information and each millimeter-wave base station 300.

The control station 100 updates the database 103 every time the millimeter-wave signal quality information regarding each positional information is reported. By doing so, the control station 100 grasps the reception quality in each directivity of the millimeter-wave base station 300 and each directivity of the terminal station 400 in each position in the communication area of the microwave base station 200.

The processing in the channel measurement period in ST 101 to ST 106 may be performed on a regular basis at predetermined intervals or may be performed at irregular intervals with specific timing which is determined by the control station 100.

In the data communication period depicted in FIG. 3, in ST 107, when the terminal station 400 desires to perform data communication, the terminal station 400 transmits a data bandwidth reservation request for starting data communication to the microwave base station 200.

In ST 108, in a manner similar to ST 104, the microwave base station 200 estimates the position of the terminal station 400 by using the packet transmitted from the terminal station 400. For example, the microwave base station 200 may estimate the position of the terminal station 400 by using the packet (LTF) containing the data bandwidth reservation request received in ST 107. Alternatively, the microwave base station 200 may request the terminal station 400 to transmit a reference signal when receiving the data bandwidth reservation request and estimate the position of the terminal station 400 by using the reference signal which is transmitted from the terminal station 400.

In ST 109, the microwave base station 200 reports, to the control station 100, the data bandwidth reservation request received in ST 107 and the positional information of the terminal station 400 estimated in ST 108.

In ST 110, when receiving the data bandwidth reservation request in ST 109, the control station 100 refers to the database 103 by using the positional information of the terminal station 400 received in ST 109 as a key and determines a radio resource for the terminal station 400.

For example, the control station 100 refers to the contents of the database 103 depicted in FIG. 6 and allocates, to the terminal station 400, a radio resource corresponding to a beam set indicating the highest reception level of the reception levels corresponding to the positional information of the terminal station 400. For example, when the positional information of the terminal station 400 reported from the microwave base station 200 is [001101], the control station 100 performs a comparison among a plurality of beam sets corresponding to [001101] depicted in FIG. 6 and allocates the beam set 2 of the millimeter-wave AP 2 with the highest reception level (−65 dBm) to the terminal station 400.

For the terminal station 400, the control station 100 generates the millimeter-wave radio resource control information indicating the radio resource thus determined (the millimeter-wave radio resource control information containing a millimeter-wave base station 300 with which communication is to be performed, the directivity, and so forth). Moreover, for the millimeter-wave base station 300 which performs millimeter-wave communication with the terminal station 400, the control station 100 generates the millimeter-wave radio resource control information indicating the radio resource thus determined (containing the terminal station 400 with which communication is to be performed, the directivity, and so forth).

In ST 111, the control station 100 notifies the millimeter-wave base station 300 of the millimeter-wave radio resource control information generated in ST 110 via the microwave base station 200. In ST 112, the millimeter-wave base station 300 switches the directivity in accordance with the millimeter-wave radio resource control information received in ST 111.

In ST 113, the control station 100 notifies the terminal station 400 of the millimeter-wave radio resource control information generated in ST 110 via the microwave base station 200. In ST 114, the terminal station 400 switches the directivity in accordance with the millimeter-wave radio resource control information received in ST 113.

In ST 115, the millimeter-wave base station 300 and the terminal station 400 perform data communication using the millimeter-wave band. For example, as depicted in FIG. 7, the millimeter-wave base station 300 and the terminal station 400 perform data communication while switching the directivity to the directivity notified by the millimeter-wave radio resource control information.

As depicted in FIG. 7, in the data communication depicted in ST 115, the terminal station 400 (or the millimeter-wave base station 300) may measure the signal quality in the combination (beam set) of the directivities to which switching has been performed in ST 112 and ST 114 and reports the signal quality to the microwave base station 200 as the millimeter-wave signal quality information (ST 116). In this case, as in the case of ST 108, the microwave base station 200 estimates the position of the terminal station 400 (ST 117) and reports the millimeter-wave signal quality information and the positional information to the control station 100 (ST 118). As in the case of ST 110, the control station 100 updates the database 103 based on the positional information and the millimeter-wave signal quality information received in ST 118 (ST 119). This makes it possible to update the contents of the database 103 to the latest state also in the data communication period other than the channel measurement period and thereby improve the accuracy of resource allocation in the control station 100.

In this way, in this embodiment, the control station 100 holds the millimeter-wave signal quality information generated by the terminal station 400 and the positional information corresponding to the millimeter-wave signal quality information in a state in which the millimeter-wave signal quality information and the positional information are related to each other. That is, in the communication system 10, the control station 100 collects the status of the channel quality of millimeter-wave communication in the microwave communication area having wider coverage than that of millimeter-wave communication. By doing so, the control station 100 grasps in advance the communication environment of the terminal station 400 in millimeter-wave communication in each position in the communication area of the microwave base station 200.

Then, by referring to the database 103 by using, as a key, the current position of the terminal station 400 which makes a data bandwidth reservation request for millimeter-wave communication, the control station 100 identifies the optimum directivity of the terminal station 400 and the optimum directivity of the millimeter-wave base station 300. That is, in the communication system 10, since the optimum directivity is determined every time the terminal station 400 starts data communication, there is no need to test all the combinations of the directivities which can be set by the terminal station 400 and the millimeter-wave base station 300.

Thus, according to this embodiment, it is possible to shorten the time that elapses before initial connection is established when initial connection is performed with switching of a directivity being performed. Moreover, since it is possible to start data communication more quickly by reducing the time required for a directivity selection process, it is possible to enhance system throughput.

Moreover, in this embodiment, the microwave base station 200 identifies the position of the terminal station 400 by using the packet which is transmitted from the terminal station 400 in the microwave band (see FIG. 5). Specifically, the microwave base station 200 uses the propagation path information estimated by using the packet (LTF) transmitted from the terminal station 400 in the microwave band as the positional information. By doing so, as compared to a case in which the absolute position of the terminal station 400 is estimated, it is possible to perform processing to estimate the position of the terminal station 400 more easily.

Furthermore, in this embodiment, in the database 103, the control station 100 grasps the positions of the plurality of terminal stations 400 present in the microwave communication area and the signal quality in each of the directivities ire these positions. This allows the control station 100 to predict the amount of interference from the plurality of millimeter-wave base stations 300 in each position in which the terminal station 400 can be present. Thus, the control station 100 may further perform resource allocation control in which consideration is given to interference from the plurality of millimeter-wave base stations 300 in accordance with the positional information of the plurality of terminal stations 400 by referring to the database 103. Hereinafter, the resource allocation control in which consideration is given to interference will be described in more detail with reference to FIGS. 8A and 8B.

Figures 8A, 8B:
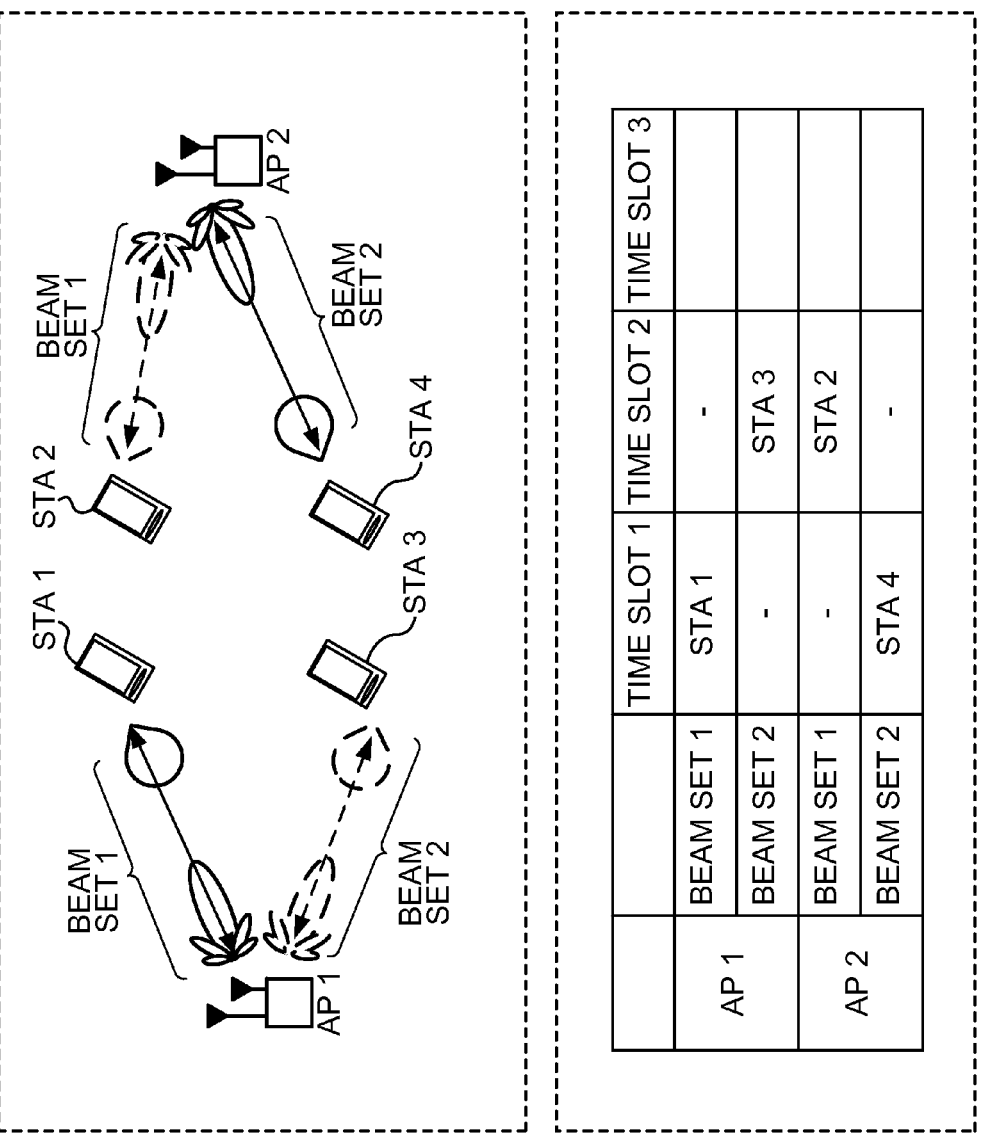
FIG. 8A depicts a resource allocation method according to this embodiment, the resource allocation method in which consideration is given to interference.
FIG. 8B depicts the resource allocation method according to this embodiment, the resource allocation method in which consideration is given to interference.

Hereinafter, as depicted in FIG. 8A, a case in which each of the STAs 1 to 4 (the terminal stations 400) performs millimeter-wave communication with the AP 1 or the AP 2 (the millimeter-wave base station 300) will be described.

In the situation depicted in FIG. 8A, by referring to the database 103, the control station 100 identifies the millimeter-wave signal quality in the directivity of the millimeter-wave base station 300 and the directivity of the terminal station 400 in each of the positions of the plurality of terminal stations 400. That is, the control station 100 grasps the signal quality in each of the positions of the STAs 1 to 4 in the database 103. For example, it is assumed that the control station 100 grasps the fact that the optimum reception quality (for example, the highest reception level) can be obtained by allocating the beam set 1 of the AP 1 to the STA 1 depicted in FIG. 8A, the beam set 1 of the AP 2 to the STA 2, the beam set 2 of the AP 1 to the STA 3, and the beam set 2 of the AP 2 to the STA 4 by referring to the database 103.

However, in FIG. 8A, assume that the control station 100 sets the beam set 1 of the AP 1 to the STA 1 and the beam set 1 of the AP 2 to the STA 2 at the same time (in the same time slot). In this case, the STA 1 receives not only a signal (a desired signal) from the AP 1 but also a signal (an interference signal) from the AP 2 at the same time, which sometimes results in an increase in the error rate in the STA 1. Likewise, the STA 2 receives not only a signal (a desired signal) from the AP 2 but also a signal (an interference signal) from the AP 1 at the same time, which sometimes results in an increase in the error rate in the STA 2. The above-described interference in the STA 1 and the STA 2 can occur also in the STA 3 and the STA 4.

Therefore, the control station 100 determines, for each of the plurality of terminal stations 400, a millimeter-wave base station 300 with which communication is to be performed, the directivity of the millimeter-wave base station 300 and the directivity of the terminal station 400, and a time slot such that interference caused by signals from the plurality of millimeter-wave base stations 300 does not occur in the plurality of terminal stations 400.

For example, as depicted in FIG. 8B, the control station 100 performs allocation of the beam set 1 of the AP 1 to the STA 1 and allocation of the beam set 1 of the AP 2 to the STA 2 at different times, not at the same time. For instance, in FIG. 8B, the control station 100 sets the beam set 1 of the AP 1 to the STA 1 in a time slot 1 and sets the beam set 1 of the AP 2 to the STA 2 in a time slot 2. Likewise, in FIG. 8B, the control station 100 sets the beam set 2 of the AP 2 to the STA 4 in the time slot 1 and sets the beam set 2 of the AP 1 to the STA 3 in the time slot 2.

By doing so eliminates the possibility that, for example, as depicted in FIG. 8A, the signals transmitted from the AP 1 and the AP 2 cause interference in an STA other than a transmission target STA in each of the time slots 1 and 2.

As described above, the control station 100 predicts the amount of interference from the plurality of millimeter-wave base stations 300 in each terminal station 400 by referring to the database 103 and performs resource allocation with consideration given to the predicted amount of interference. As a result, for example, even when, in addition to the terminal station 400 toward which a signal is made to travel from a certain millimeter-wave base station 300 by adjusting the directivity of the millimeter-wave base station 300, another terminal station 400 makes a data bandwidth reservation request, the control station 100 can identify the signal quality in the position of the other terminal station 400 and thereby appropriately control a radio resource (a directivity, a time resource, and so forth) for these terminal stations 400.

In other words, according to this embodiment, the control station 100 can perform control of a radio resource by predicting a combination of the terminal stations 400 with which the system rate is maximized under a constraint condition for equity among the terminal stations 400. As a result, in the communication system 10, it is possible to place millimeter-wave communication areas with narrow coverage and good directivity in high density, which also makes it possible to increase the system capacity.

This is the end of the description of the embodiment of the present disclosure.

In the communication system 10 depicted in FIG. 1, a case in which the control station 100 is connected to each microwave base station 200 has been described, but the control station 100 may be directly connected to the millimeter-wave base station 300 in addition to the microwave base station 200.

Moreover, in the embodiment described above, the positional information of the terminal station 400 is not limited to the propagation path information represented as a bit string (see FIG. 5); for example, the positional information of the terminal station 400 may be represented as a position (x, y) in the planar coordinates.

In the embodiment described above, the description has been given by taking up, as an example, a case in which the present disclosure is formed of hardware, but the present disclosure can also be implemented by software in cooperation with hardware.

Moreover, each functional block used in the description of the embodiment described above is implemented as LSI which is typically an integrated circuit. These functional blocks may be individually implemented as one chip or may be implemented as one chip in such a way as to include part or all of the functional blocks. The name "LSI" is used here, but, depending on the difference in the degree of integration, it may be called an IC, system LSI, super LSI, or ultra LSI.

The present disclosure is suitably used hi a mobile communication system.

What is claimed is:

1. A communication system comprising:
 a microwave base station that performs communication by using a microwave band;
 a plurality of millimeter-wave base stations that are provided in a communication area of the microwave base station and perform communication by using a millimeter-wave band while switching a directivity;
 a plurality of terminal stations, each performing communication with the microwave base station and a millimeter-wave base station which is any one of the plurality of millimeter-wave base stations; and
 a control station that is connected to the microwave base station, wherein
 a terminal station which is each of the plurality of terminal stations includes
  a signal quality estimator that estimates a signal quality of each of a plurality of combinations of a first directivity of the millimeter-wave base station and a second directivity of the terminal station and generates millimeter-wave signal quality information indicating the signal quality, and
  a radio communicator that transmits the millimeter-wave signal quality information or a data bandwidth reservation request for starting data communication to the microwave base station,
 the microwave base station includes
  a position estimator that estimates a first position of the terminal station that has transmitted the millimeter-wave signal quality information and a second position of the terminal station that has transmitted the data bandwidth reservation request, and
  a communicator that transmits, to the control station, the millimeter-wave signal quality information and the first position or the data bandwidth reservation request and the second position, and the control station includes
   a database that stores the millimeter-wave signal quality information and the first position in association with each other, and
   a controller that determines, for the terminal station that has transmitted the data bandwidth reservation request, a millimeter-wave base station with which communication is to be performed, the first directivity, and the second directivity by referring to the database by using the second position, and allocates a radio resource based on the determined millimeter-wave base station, first directivity, and second directivity.

2. The communication system according to claim 1, wherein
   the position estimator estimates the first position and the second position by using a signal which is transmitted from the terminal station on the microwave band.

3. The communication system according to claim 1, wherein
   the position estimator estimates a propagation path status between the microwave base station and the terminal station by using a preamble added to a data packet, the data packet containing the millimeter-wave signal quality information or the data bandwidth reservation request which is transmitted from the terminal station by using the microwave band, and uses the estimated propagation path status as positional information indicating the first position or the second position.

4. The communication system according to claim 3, wherein
   the propagation path status is at least one of a reception level, a reception waveform, a delay profile, and a frequency spectrum of the preamble at the microwave base station.

5. The communication system according to claim 1, wherein
   the millimeter-wave signal quality information is at least one of received power, an SNR, and an SINR, at the terminal station, of a signal transmitted from the millimeter-wave base station.

6. The communication system according to claim 1, wherein
   the radio resource avocation is further based on information of transmitted power or information of transmission channel.

7. The communication system according to claim 1, wherein
   the controller identifies a signal quality in the first directivity and the second directivity in the second position of each of the plurality of terminal stations by referring to the database and determines the millimeter-wave base station with which communication is to be performed, the first directivity, the second directivity, and a time slot for the plurality of terminal stations, such that interference caused by signals from the plurality of millimeter-wave base stations does not occur in the plurality of terminal stations.

8. A control station that is connected to a microwave base station in a communication system including the microwave base station that performs communication by using a microwave band, a plurality of millimeter-wave base stations that are provided in a communication area of the microwave base station and perform communication by using a millimeter-wave band while switching a directivity, and a plurality of terminal stations, each performing communication with the microwave base station and a millimeter-wave base station which is any one of the plurality of millimeter-wave base stations, the control station comprising:
   a communicator that receives millimeter-wave signal quality information indicating a signal quality of each of a plurality of combinations of a first directivity of the millimeter-wave base station and a second directivity of a terminal station which is any one of the plurality of terminal stations and a first position of the terminal station that has transmitted the millimeter-wave signal quality information, or a data bandwidth reservation request which is transmitted by the terminal station to start data communication and a second position of the terminal station that has transmitted the data bandwidth reservation request;
   a database that stores the millimeter-wave signal quality information and the position in association with each other; and
   a controller that determines, for the terminal station that has transmitted the data bandwidth reservation request, a millimeter-wave base station with which communication is to be performed, the first directivity, and the second directivity by referring to the database by using the second position, and allocates a radio resource based on the determined millimeter-wave base station, the first directivity, and the second directivity.

9. A resource control method used in a communication system including a microwave base station that performs communication by using a microwave band, a plurality of millimeter-wave base stations that are provided in a communication area of the microwave base station and perform communication by using a millimeter-wave band while switching a directivity, a plurality of terminal stations, each performing communication with the microwave base station and a millimeter-wave base station which is any one of the plurality of millimeter-wave base stations, and a control station that is connected to the microwave base station, the resource control method implement by the control station comprising:
   causing a terminal station which is any one of the plurality of terminal stations, to estimate a signal quality of each of a plurality of combinations of a first directivity of the millimeter-wave base station and a second directivity of the terminal station, and to generate millimeter-wave signal quality information indicating the signal quality;
   causing the terminal station to transmit the millimeter-wave signal quality information or a data bandwidth reservation request for the terminal station to start data communication;
   causing the microwave base station to estimate a first position of the terminal station that has transmitted the millimeter-wave signal quality information or a second position of the terminal station that has transmitted the data bandwidth reservation request;
   causing the microwave base station to transmit the millimeter-wave signal quality information and the first position, or the data bandwidth reservation request and the second position to the control station; and
   determine, for the terminal station that has transmitted the data bandwidth reservation request, a millimeter-wave base station with which communication is to be performed, the first directivity, and the second directivity by using the second position by referring to a database in which the millimeter-wave signal quality information and the first position are stored in association with each other, and allocating a radio resource based on the determined millimeter-wave base station, first directivity, and second directivity.

10. A microwave base station in a communication system including the microwave base station that performs communication by using a microwave band, a plurality of millimeter-wave base stations that are provided in a communication area of the microwave base station and perform communication by using a millimeter-wave band while switching a directivity, a plurality of terminal stations, each performing communication with the microwave base station and a millimeter-wave base station which is any one of the plurality of millimeter-wave base stations, and a control station that is connected to the microwave base station, the microwave base station comprising:

- a radio communicator that receives, from a terminal station which is any one of the plurality of terminal stations, millimeter-wave signal quality information indicating a signal quality of each of a plurality of combinations of a first directivity of the millimeter-wave base station and a second directivity of the terminal station, or a data bandwidth reservation request transmitted for the terminal station to start data communication with the millimeter-wave base station;
- a position estimator that estimates a first position of the terminal station that has transmitted the millimeter-wave signal quality information and a second position of the terminal station that has transmitted the data bandwidth reservation request; and
- a communicator that transmits the millimeter-wave signal quality information and the first position or the data bandwidth reservation request and the second position to the control station.

* * * * *